United States Patent
Yoshino (10) Patent No.: US 7,859,743 B2
(45) Date of Patent: Dec. 28, 2010

(54) HARMONICS GENERATING DEVICES

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 10 days.

(21) Appl. No.: 12/395,926

(22) Filed: Mar. 2, 2009

(65) Prior Publication Data

US 2009/0231679 A1  Sep. 17, 2009

(30) Foreign Application Priority Data

Mar. 17, 2008 (JP) .............................. 2008-067047

(51) Int. Cl.
*G02F 2/02* (2006.01)

(52) U.S. Cl. .......................... 359/326; 359/328; 372/22

(58) Field of Classification Search ......... 359/326–332; 372/21–22
See application file for complete search history.

(56) References Cited

U.S. PATENT DOCUMENTS

| | | | | |
|---|---|---|---|---|
| 5,521,750 A | * | 5/1996 | Onoe et al. ................. | 359/332 |
| 5,652,674 A | * | 7/1997 | Mizuuchi et al. ............ | 359/326 |
| 5,836,073 A | * | 11/1998 | Mizuuchi et al. ............. | 29/600 |
| 2006/0133767 A1 | | 6/2006 | Yamaguchi et al. | |
| 2006/0257084 A1 | * | 11/2006 | Mizuuchi et al. ............ | 385/122 |
| 2007/0189689 A1 | | 8/2007 | Yamaguchi et al. | |
| 2009/0040596 A1 | * | 2/2009 | Mizuuchi et al. ............ | 359/328 |

FOREIGN PATENT DOCUMENTS

| | | |
|---|---|---|
| JP | 5-289132 | 11/1993 |
| JP | 06230443 A * | 8/1994 |
| JP | 11-288011 | 10/1999 |
| JP | 2002-258340 | 9/2002 |
| JP | 2003-295242 | 10/2003 |
| JP | 2004-21011 | 1/2004 |
| JP | 2005-070192 A1 | 3/2005 |
| WO | 2006/041172 A1 | 4/2006 |
| WO | WO 2006112303 A1 * | 10/2006 |

OTHER PUBLICATIONS

Partial Machine translation of JP2003295242, Kiminori et al, Oct. 15, 2003.*

H.K. Nguyen, et al., "*107-mW Low-Noise Green Light Emission by Frequency Doubling of Reliable 1060-nm DFB Semiconductor Laser Diodes*," IQEC/CLEO-PR 2005, Tokyo, Japan, Jul. 11-15, 2005, post-deadline paper PDG-2.

Ishigame et al., *LiNbO₃ waveguide second-harmonic-generation device phase matched with a fan-out domain-inverted grating*, Optical Society of America, Optics Letters, vol. 18, No. 6, Mar. 15, 1991, pp. 375-377.

* cited by examiner

*Primary Examiner*—Hemang Sanghavi
(74) *Attorney, Agent, or Firm*—Burr & Brown (57) ABSTRACT

A harmonics generating device has a periodic domain inversion structure 18 for converting a wavelength of laser beam to generate higher harmonics. An angle $\theta$ formed by a domain inversion plane P of the periodic domain inversion structure 8 and a propagation direction L of the laser beam is from 80 degrees to 89 degrees.

6 Claims, 6 Drawing Sheets

HARMONICS GENERATING DEVICES

This application claims the benefit of Japanese Patent Application P2008-67047 filed on Mar. 17, 2008, the entirety of which is incorporated by reference.

FIELD OF THE INVENTION

The present invention relates to a harmonics generating device.

BACKGROUND OF THE INVENTION

Across the entire gamut of technology of optical information processing, in order to realize high-density optical recording, a blue light laser stably oscillating blue light with a wavelength of approximately 400 to 430 nm at an output of 30 mW or more is required, and a development race is now on. As a blue light source, there is expected an optical waveguide type wavelength conversion device in which a laser that oscillates red light as a fundamental wave and a second-harmonic-generation device of a quasi-phase-matched system are combined.

Nonlinear optical crystal such as lithium niobate or lithium tantalate single crystal has a high secondary nonlinear optical constant. When a periodic domain polarization inversion structure is formed in the above crystals, a second-harmonic-generation (SHG) device of a quasi-phase-matched (QPM) system can be realized. Further, when a waveguide is formed within this periodic domain inversion structure, the high-efficiency SHG device can be realized and further, applied to optical communication, medical science, photochemistry, various optical measurements over a wide range.

In IQEC/CLEO-PR 2005, Tokyo, Japan, Jul. 11-15, 2005, post-deadline paper PDG-2, disclosed is a technology in which a fundamental wave from a DFB laser diode is condensed by a condenser lens, higher harmonics (green light) are obtained by irradiating the wave onto a PPLN optical waveguide device, and these higher harmonics are condensed to thereby be oscillated. The PPLN optical waveguide device is obtained by forming an optical waveguide in an MgO doped lithium niobate single crystal substrate and forming the periodic domain inversion structure within this optical waveguide. An incident side end face and projection side end face of the optical waveguide device made of lithium niobate single crystal are polished so as to be largely inclined from a plane perpendicular to the optical waveguide. Thereby, the incidence of return light onto a laser oscillation source is prevented.

Further, the present assignee disclosed that the periodic domain inversion structure is formed on a bulk substrate including a Z plate made of a lithium niobate single crystal and the second-harmonic-generation device is manufactured (Japanese published unexamined application No. 2005-70192A). Also, the assignee disclosed that a channel type optical waveguide is formed on a thin lithium niobate single crystal-5 degree off-cut Y substrate, and the periodic domain inversion structure is formed within this optical waveguide to thereby obtain the second-harmonic-generation device (WO 2006/41172 A1).

SUMMARY OF THE INVENTION

However, the present inventors optically coupled a waveguide harmonics generating device to a broad area semiconductor laser source, and performed a wavelength conversion in the periodic domain inversion structure. As a result, higher harmonics may oscillate unsteadily in some cases.

Also, the inventors optically coupled a bulk device including a Z plate made of a lithium niobate single crystal onto the broad area semiconductor laser source, and performed a wavelength conversion in the periodic domain inversion structure. As a result, higher harmonics may oscillate unsteadily in some cases. When using the bulk device, a light source and a resonator are formed, so that the above-described unstable oscillation can be prevented. However, in this case, it is found that a fundamental-wave laser beam is reflected and scattered to be lost by the periodic domain inversion structure, thus lowering the wavelength conversion efficiency.

An object of the present invention is to prevent an unstable oscillation of higher harmonics in a harmonics generating device including a periodic domain inversion structure for converting a wavelength of laser beam to generate a higher harmonics.

The present invention provides a harmonics generating device comprising a periodic domain inversion structure for converting a wavelength of laser beam to generate a higher harmonics, in which an angle $\theta$ formed by a domain inversion plane of the periodic domain inversion structure and the direction of propagation of the laser beam is from 80 degrees to 89 degrees.

Figure 1:
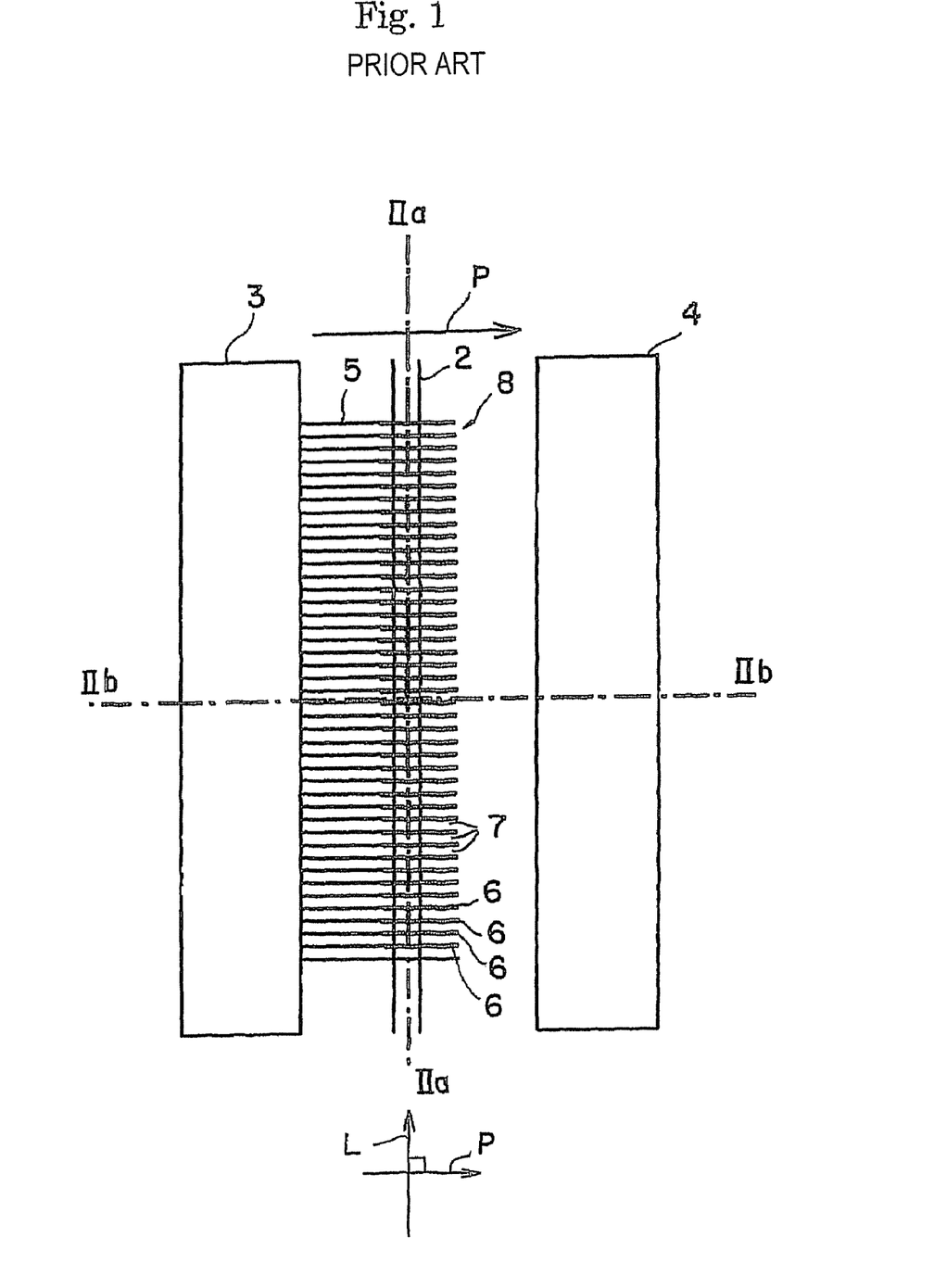
FIG. 1 is a plan view schematically showing a state in which a periodic domain inversion structure 8 is formed on a surface of an optical waveguide substrate.
Figure 2:
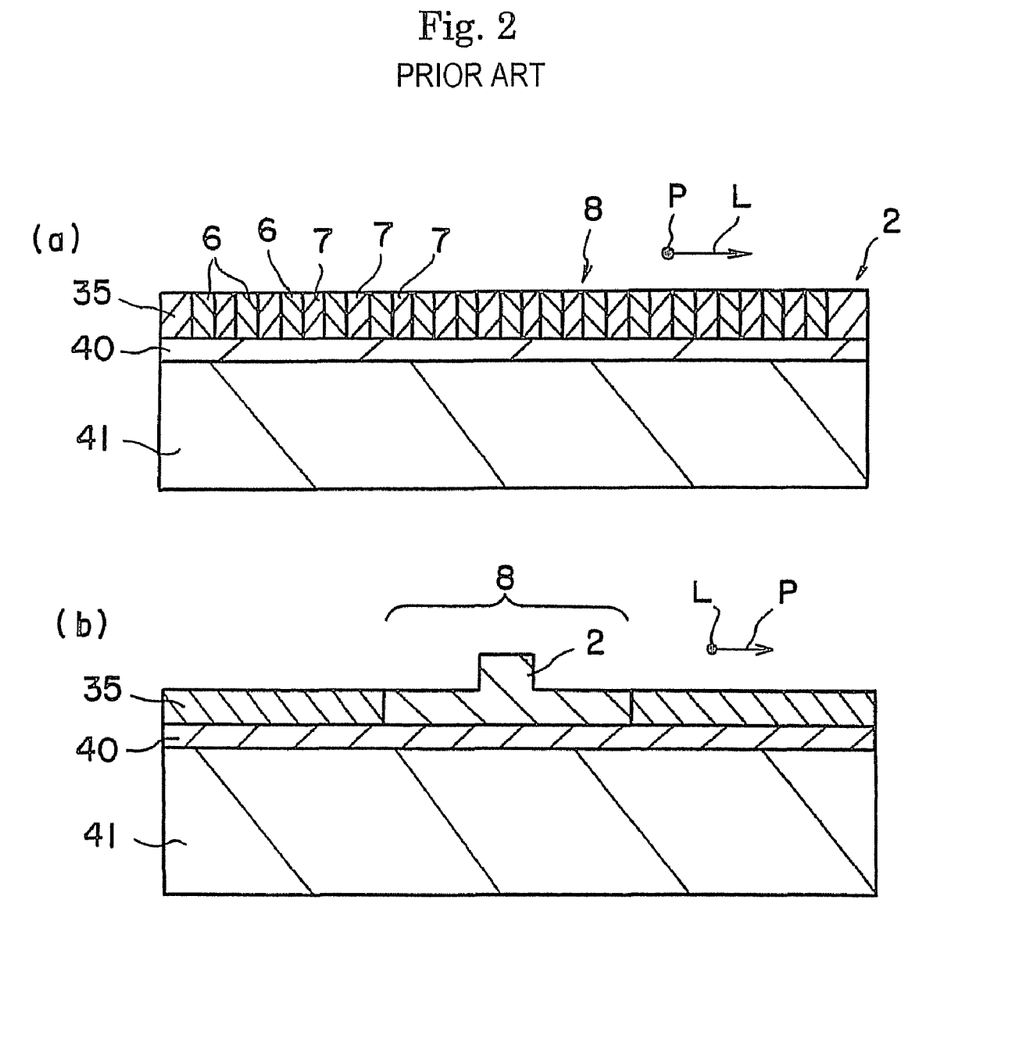
FIG. 2(a) is a cross-sectional view taken along the line IIa-IIa of FIG. 1.
FIG. 2(b) is a cross-sectional view taken along the line IIb-IIb of FIG. 1.

The inventors have examined a cause of the unstable oscillation of the fundamental-wave laser beam, and have found the followings. A description will be made with reference to FIGS. 1 and 2. The periodic domain inversion structure 8 is obtained by alternatively forming a number of domain inversion parts 6 and polarization non-inversion parts 7. In an example of FIG. 1, a channel type optical waveguide 2 is disposed in a direction perpendicular to a domain inversion plane P, and the fundamental-wave laser beam is allowed to be incident onto an end face of the waveguide in a direction indicated by an arrow L and to propagate through the waveguide.

However, at this time, the inventors have found that due to the diffraction phenomenon within the periodic domain inversion structure 8, a part of the fundamental wave incident onto the optical waveguide becomes return light and is incident onto a laser source to cause resonance, and thereby, the fundamental wave unsteadily oscillates. Such a diffraction phenomenon is caused by a periodic structure of the periodic domain inversion structure. However, the diffraction phenomenon and return light have not been conventionally observed, and for the first time, the inventors identified the return light as a cause of the unstable oscillation of the fundamental wave based on their findings.

DETAILED DESCRIPTION OF THE INVENTION

Hereinafter, the present invention will be further described in detail.

FIG. 1 and FIGS. 2(a) and 2(b) relate to a conventional example. FIG. 1 is a plan view schematically showing a state in which a periodic domain inversion structure 8 is formed on a surface of an optical waveguide substrate. FIG. 2(a) is a cross-sectional view taken along the line IIa-IIa of FIG. 1, and FIG. 2(b) is a cross-sectional view taken along the line IIb-IIb of FIG. 1.

In this example, a lower surface of an optical waveguide substrate 35 is adhered to an upper surface of a separate supporting substrate 41 via an adhesive layer 40. A number of domain inversion parts 6 and polarization non-inversion parts 7 are alternately formed in a light propagation direction L, thereby forming a periodic domain inversion structure 8. In FIG. 1, for the purpose of reference, there is shown a state where electrode pieces 5 of a comb-shaped electrode for forming domain inversion parts 6, a feeding electrode 3, and a counter electrode 4 are formed. When a predetermined voltage is applied between the feeding electrode 3 and the counter electrode 4, the domain inversion parts 6 are each extending from points of a number of the electrode pieces 5.

Boundary planes between the domain inversion parts and the domain non-inversion parts are domain inversion planes. In the conventional example, an angle θ formed by the direction P of the domain inversion plane on the surface of the substrate and the light propagation direction L is right angle. In this case, when a diffraction phenomenon is generated within the periodic domain inversion structure, return light is incident onto the laser source, and therefore, a laser beam (fundamental wave) unsteadily oscillates due to the return light.

Figure 3:
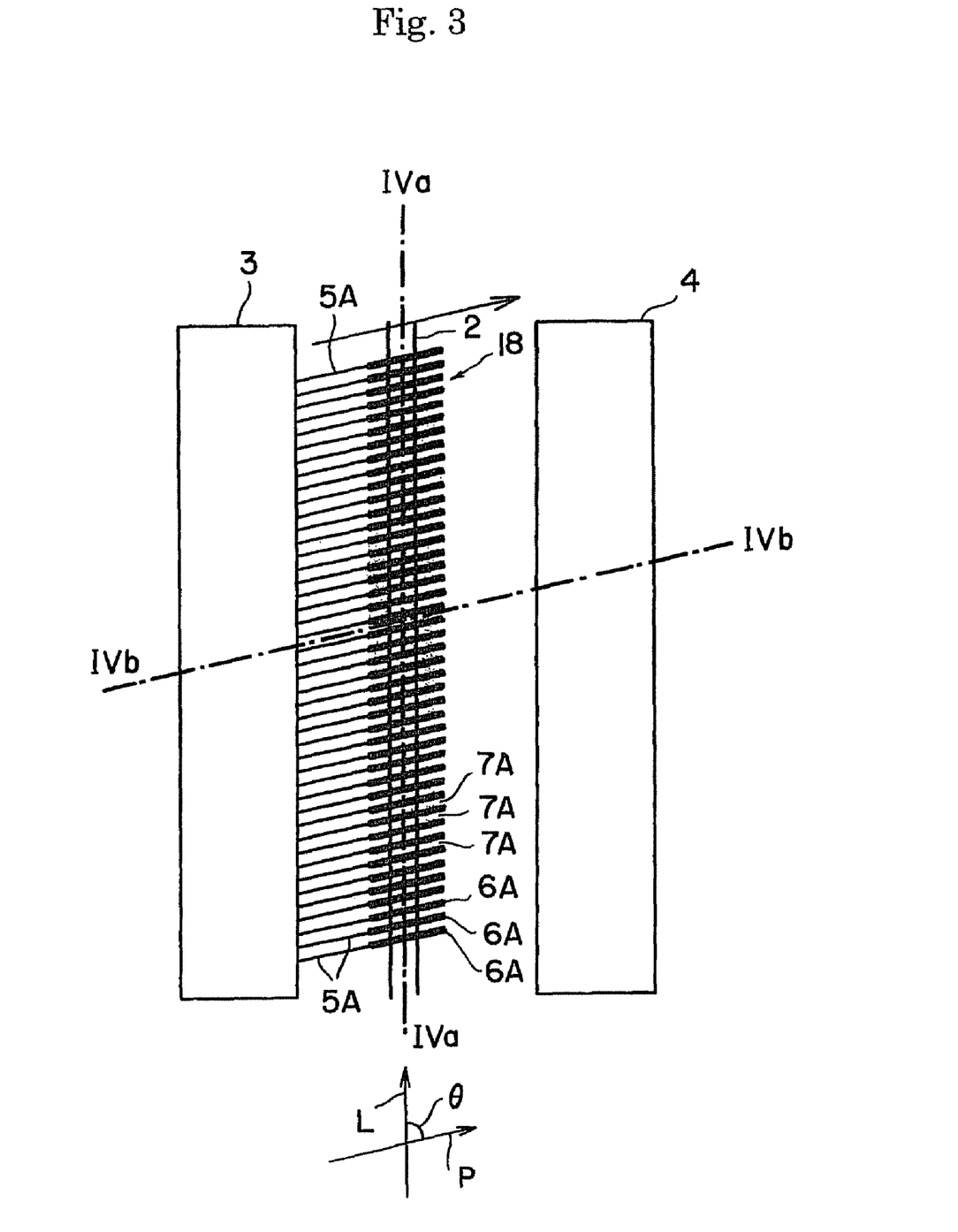
FIG. 3 is a plan view schematically showing a state in which a periodic domain inversion structure 18 is formed on a surface of an optical waveguide substrate.

FIG. 3 and FIGS. 4(a) and 4(b) relate to an example of the present invention. FIG. 3 is a plan view schematically showing a state in which a periodic domain inversion structure 18 is formed on a surface of an optical waveguide substrate. FIG. 4(a) is a cross-sectional view taken along the line IVa-IVa of FIG. 3, and FIG. 4(b) is a cross-sectional view taken along the line IVb-IVb of FIG. 3.

In the present example, the lower surface of the optical waveguide substrate 35 is adhered to the upper surface of the separate supporting substrate 41 via the adhesive layer 40. On the lower surface of the optical waveguide substrate 35, an underclad layer may be formed, and further, an overclad layer or buffer layer may be formed on the upper surface of the substrate 35. Furthermore, the upper surface of the substrate 35 may be adhered to an upper-side substrate (not shown) via the overclad layer.

A number of domain inversion parts 6A and polarization non-inversion parts 7A are alternately formed in the light propagation direction L, thereby forming a periodic domain inversion structure 18. In FIG. 3, for the purpose of reference, there is shown a state where electrode pieces 5A of a comb-shaped electrode for forming domain inversion parts 6A, the feeding electrode 3, and the counter electrode 4 are formed. When a predetermined voltage is applied between the feeding electrode 3 and the counter electrode 4, the domain inversion parts 6A are each extending from points of a number of the electrode pieces 5A.

Boundary planes between the domain inversion parts 6A and the domain non-inversion parts 7A are domain inversion planes, and the domain inversion plane can be observed, for example, by a wet etching process. In the present example, an angle θ formed by the direction P of the domain inversion plane on the substrate surface and the light propagation direction L is from 80° to 89°. In this case, even if the diffraction phenomenon occurs within the periodic domain inversion structure, return light to a laser source can be prevented, and therefore, the laser beam (fundamental wave) can be prevented from unsteadily oscillating.

FIGS. 5(a) and 5(b) relate to a conventional example. FIG. 5(a) is a plan view schematically showing a state in which a periodic domain inversion structure 28 is formed on a surface 10e of a bulk optical waveguide substrate 10. FIG. 5(b) is a cross-sectional view taken along the line Vb-Vb of FIG. 5(a).

In this example, a number of domain inversion parts 16 and polarization non-inversion parts 17 are alternately formed in the propagation direction L of a fundamental wave A, thereby forming a periodic domain inversion structure 28. Boundary planes between the domain inversion parts 16 and the polarization non-inversion parts 17 are domain inversion planes. The fundamental wave is incident from an incident surface 10a, and higher harmonics project from a projection surface 10b. Each domain inversion part 16 extends from the upper surface 10e to the lower surface 10f of the substrate 10, and further, extends between the side surfaces 10c and 10d.

In the conventional example, an angle formed by the direction P of the domain inversion plane and the light propagation direction L is right angle. In this case, when a diffraction phenomenon is generated within the periodic domain inversion structure, return light is incident onto the laser source, and therefore, the laser beam (fundamental wave) unsteadily oscillates due to the return light. When a resonator is manufactured between this device and the laser source, return light can be prevented. However, in this case, loss of light propagation increases due to reflection and scattering of the laser beam within the periodic domain inversion structure.

FIGS. 6(a) and 6(b) relate to an example of the present invention. FIG. 6(a) is a plan view schematically showing a state in which a periodic domain inversion structure 38 is formed on the surface 10e of the bulk optical waveguide substrate 10. FIG. 6(b) is a cross-sectional view taken along the line VIb-VIb of FIG. 6(a).

In this example, a number of domain inversion parts 16A and polarization non-inversion parts 17A are alternately formed in the propagation direction L of the fundamental wave A, thereby forming the periodic domain inversion structure 38. Boundary planes between the domain inversion parts 16A and the domain non-inversion parts 17A are domain inversion planes. The fundamental wave is incident from the incident surface 10a, and the higher harmonics project from the projection surface 10b. Each domain inversion part 16A extends from the upper surface 10e to the lower surface 10f of the substrate 10, and further, extends between the side surfaces 10c and 10d.

In the example of the present invention, an angle θ formed by the direction P of the domain inversion plane and the light propagation direction L is from 80° to 89°. In this case, even if a diffraction phenomenon occurs within the periodic domain inversion structure, return light to a laser source can be prevented, and therefore, the laser beam (fundamental wave) can be prevented from unsteadily oscillating. Also when a resonator is manufactured between this device and the laser source, loss of light propagation due to reflection and scattering of the laser beam within the periodic domain inversion structure can be suppressed.

As the fundamental wave laser beam, a semiconductor laser, an Nd doped YAG laser, and an Nd doped YVO$_4$ laser are preferably used.

An angle θ formed by the direction of the domain inversion plane within the periodic domain inversion structure and the propagation direction of laser beam is preferably 89 degrees or less, and more preferably 87 degrees or less, from the viewpoint of the present invention. Further, from the viewpoint that the disturbance of a wave front in the propagation light is suppressed, the angle θ is preferably 80 degrees or more, and more preferably 82 degrees or more.

The periodic domain inversion structure may be formed within a channel type optical waveguide. In this case, the waveguide may be a ridge-type wavelength conversion device projected from the adhesive layer or the substrate. Further, a nonlinear optical crystal is processed, for example, physically processed by machining or laser beam machining, and is shaped to thereby obtain the waveguide. A three-dimensional optical waveguide is adhered to the substrate via the adhesive layer made of amorphous materials. Alternatively, the optical waveguide may be formed by a metal diffusion process such as a titanium diffusion process or proton exchange.

Figure 4:
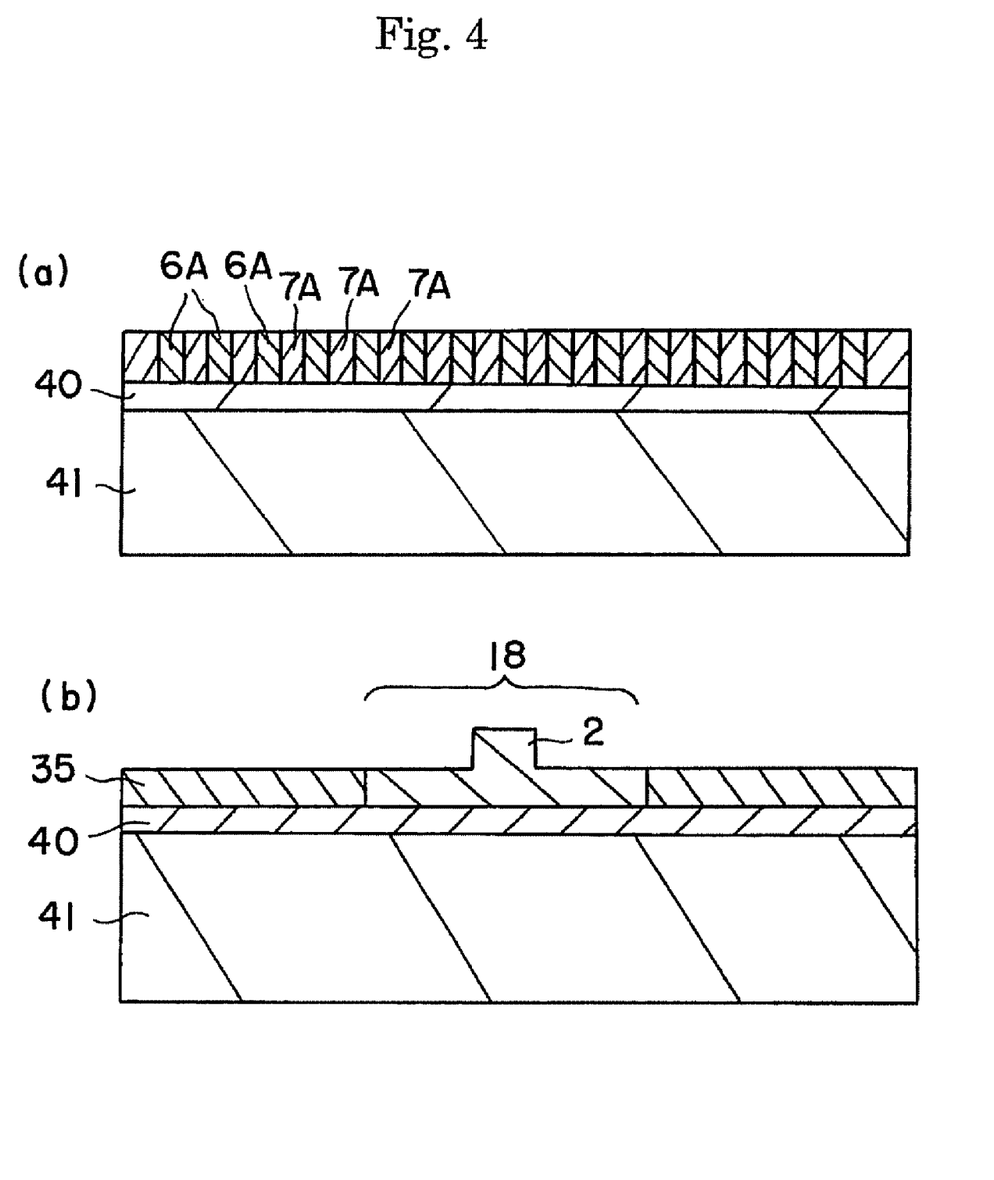
FIG. 4(a) is a cross-sectional view taken along the line IVa-IVa of FIG. 3.
FIG. 4(b) is a cross-sectional view taken along the line IVb-IVb of FIG. 3.

Further, the channel type optical waveguide may be formed on an X plate or offset X plate (a Y plate or an offset Y plate) made of ferroelectric single crystal. For example, in the example of FIGS. 3 and 4, the domain inversion direction P is a direction of the Z axis of the ferroelectric single crystal. In the present embodiment, an offset angle of the X plate is preferably 10 degrees or less.

Further, in a preferred embodiment, the periodic domain inversion structure is provided in a bulk substrate made of a ferroelectric single crystal. In this embodiment, the bulk substrate is preferably used as the Z plate. Specifically, as shown in the example of FIG. 6(a), the ferroelectric single crystal constituting the substrate 10 is polarized in the direction (Z axis) perpendicular to a paper.

The ferroelectric single crystal is not particularly limited as far as it is capable of modulating light; however, lithium niobate, lithium tantalate, lithium niobate-lithium tantalate solid solution, potassium lithium niobate, KTP, GaAs, quartz and the like are exemplified.

For further improving the resistance of the optical waveguide against optical damage, the ferroelectric single crystal includes one or more metal elements selected from the group consisting of magnesium (Mg), zinc (Zn), scandium (Sc), and Indium (In), and magnesium is most preferred. The ferroelectric single crystal includes a rare earth element as a dopant. The rare earth element functions as an additional element for laser oscillation. The rare earth element may preferably be Nd, Er, Tm, Ho, Dy or Pr.

The materials of the underclad and overclad layers include silicon oxide, magnesium fluoride, silicon nitride, alumina and tantalum pentoxide.

The material of the adhesive layer 40 may be an inorganic adhesive, an organic adhesive or a combination of inorganic and organic adhesives.

Specific examples of the material of the supporting substrate 41 are not particularly limited, but include lithium niobate, lithium tantalate, a glass such as quartz glass, quartz, Si or the like. In this case, from the viewpoint of difference of thermal expansion coefficients, the materials of the ferroelectric layer and the supporting substrate may preferably be the same, and lithium niobate single crystal is particularly preferred.

EXAMPLES

Example 1

A harmonics generating device as shown in FIGS. 3 and 4 was manufactured. Specifically, electrodes 3, 4, and 5A as well as a periodic domain inversion structure 18 with a period of 6.6 μm were formed on an MgO 5% doped lithium niobate-5 degree off-cut Y substrate of 0.5 mm thick. The adhesive 40 was applied to a non-doped lithium niobate substrate 41 of 0.5 mm thick. Next, the above-described MgO doped lithium niobate substrate was stuck to the substrate, and the surface of the MgO doped lithium niobate substrate was abraded and polished until the thickness thereof reached 3.7 μm. In such a way, a thin optical waveguide substrate 35 was produced.

Subsequently, a ridge-type optical waveguide 2 was formed on this substrate 35 by laser abrasion. On this occasion, the optical waveguide 2 was processed such that the light propagation direction L formed an angle of 85 degrees with respect to the Z axis of the crystal. After forming the optical waveguide, an SiO$_2$ overclad of 0.5 μm thick was formed by sputtering. After the device was cut into a length of 9 mm and a width of 1.0 mm by a dicer, the end faces of the device was polished, thereby forming the antireflection films. An angle formed by the direction of the domain inversion plane P and the optical propagation direction L is 85 degrees.

The optical characteristics of this optical waveguide were measured by using a semiconductor laser. The oscillation output from the laser source was adjusted at 350 mW, and the fundamental light was condensed on the end face of the waveguide by a lens; as a result, the SHG output of 110 mW was obtained. The wavelength of the fundamental light at that moment was 1063.5 nm. The oscillation state of the semiconductor laser beam was stable and power variation was not observed.

Comparative Example 1

The device as shown in FIGS. 1 and 2 was manufactured in the same procedure as in the Example 1. It should be noted that, being different from the Example 1, when forming the ridge-type optical waveguide 2, the waveguide 2 was processed such that the light propagation direction P formed right angle with respect to the Z axis of the crystal. An angle formed by the direction P of the domain inversion plane and the light propagation direction L is right angle.

When the optical characteristics of this device were measured, the oscillation of the semiconductor laser source did not stabilize and therefore, only an output of 54 mW was obtained in contrast with the input of 350 mW.

Example 2

Figure 6:
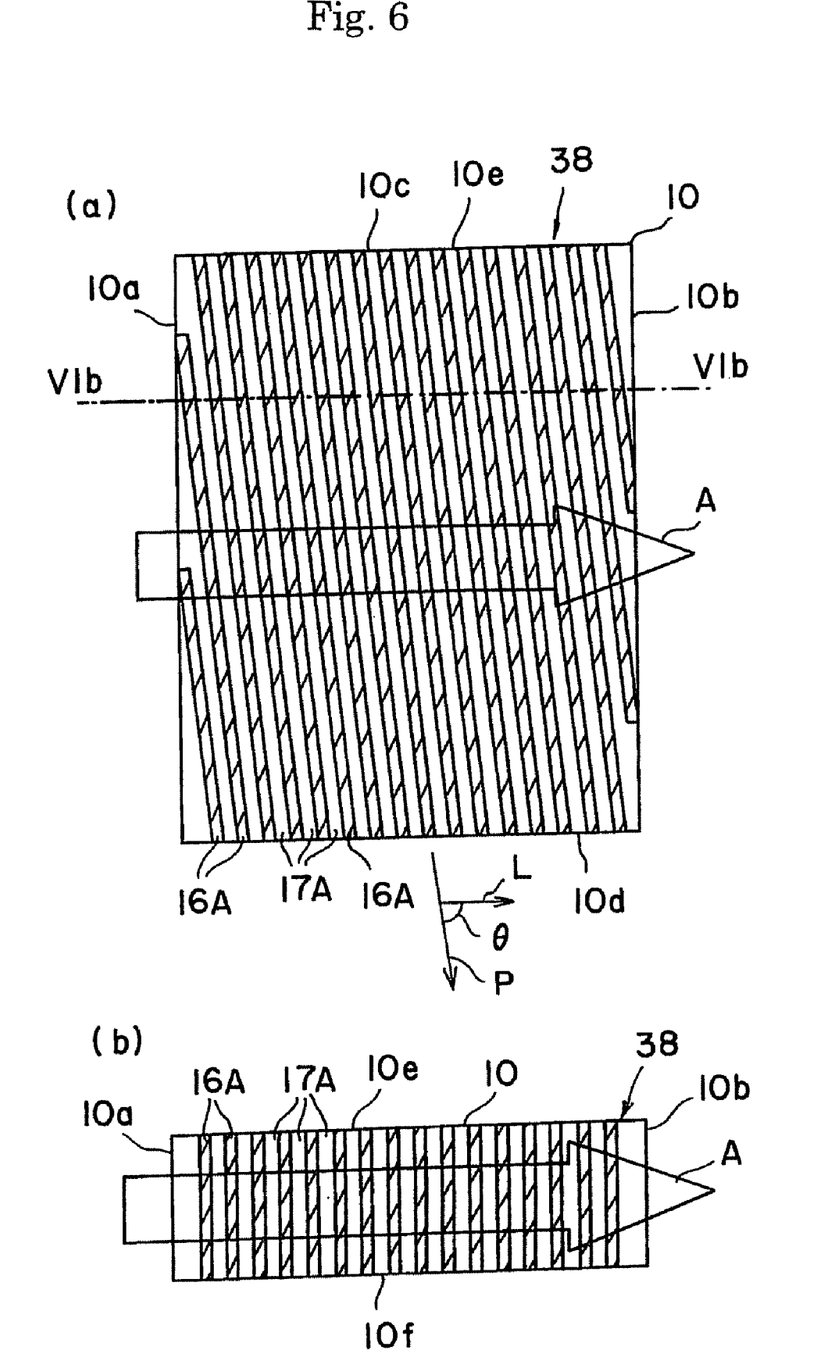
FIG. 6(a) is a plan view schematically showing a state in which a periodic domain inversion structure 38 is formed on the surface 10e of the bulk optical waveguide substrate 10 of the present invention.
FIG. 6(b) is a cross-sectional view taken along the line VIb-VIb of FIG. 6(a).

The device as shown in FIG. 6 was manufactured. Specifically, a periodic domain inversion structure 38 with a period of 6.9 μm was formed on the Z substrate made of an MgO 5% doped lithium niobate single crystal of 0.5 mm thick. The substrate was cut out into devices with a dicer, and the device with a length of 2 mm and a width of 3.0 mm was manufactured. On this occasion, a direction of the domain inversion plane formed an angle θ of 82 degrees with respect to the light propagation direction. Thereafter, the end faces of the device were polished, and the antireflection films for preventing reflection of the wavelengths of 1062 nm and 531 nm was formed on the incident side, thereby obtaining a bulk device.

This bulk device and the Nd doped YAG laser device were placed within the resonator, and excited by the semiconductor laser beam with a wavelength of 808 nm. The laser beam with a wavelength of 531 nm was obtained with an output of 100 mW in contrast with the amount of excitation light of 1 W.

Comparative Example 2

Figure 5:
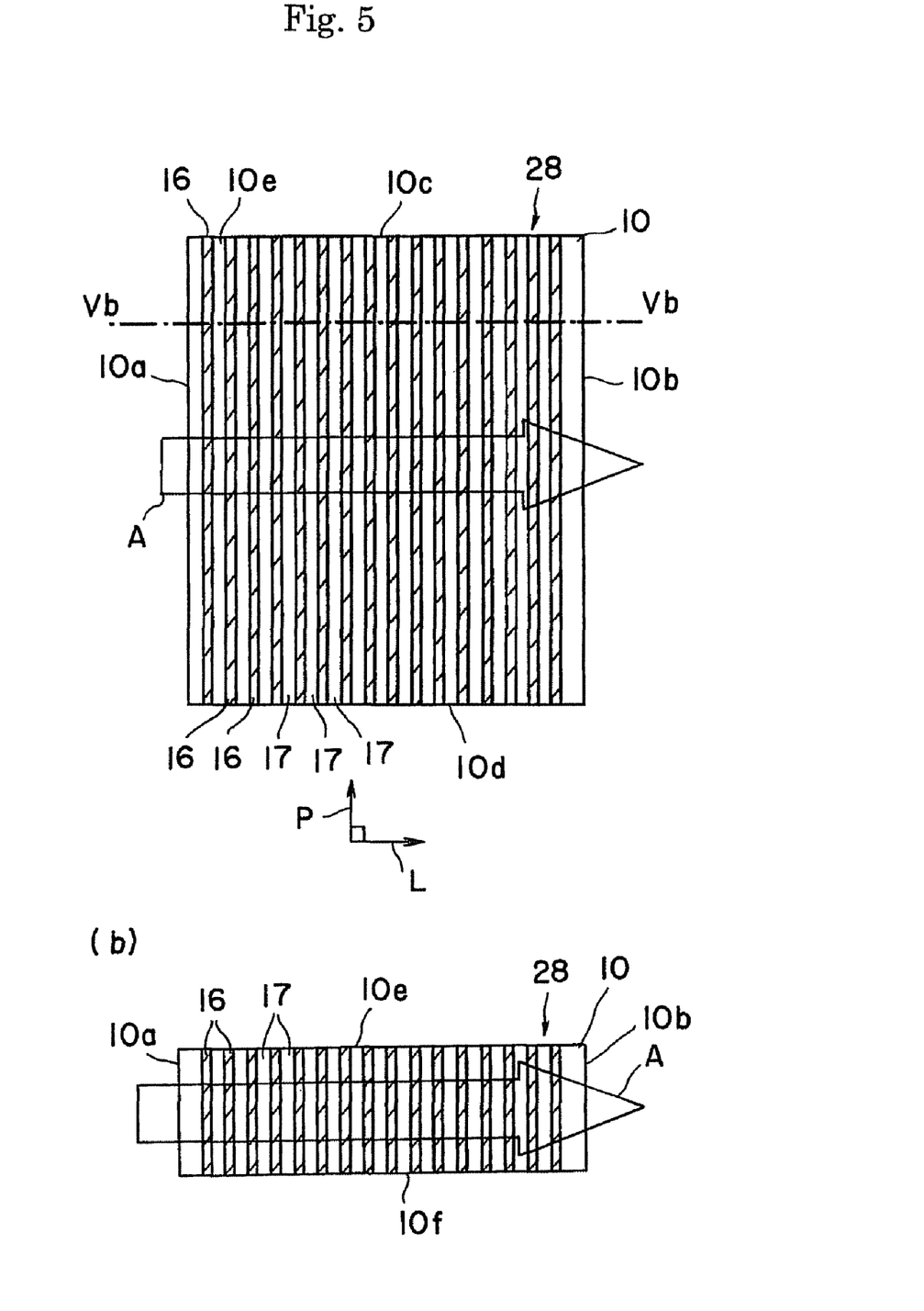
FIG. 5(a) is a plan view schematically showing a state in which a periodic domain inversion structure 28 is formed on a surface 10e of a bulk optical waveguide substrate 10 of a comparative example.
FIG. 5(b) is a cross-sectional view taken along the line Vb-Vb of FIG. 5(a).

The device shown in FIG. 5 was manufactured in the same procedure as in the Example 2. It should be noted that, when cutting out the substrate, the device was processed such that the direction P of the domain inversion plane formed right angle with respect to the light propagation direction L. The optical characteristics of this device were measured within the resonator in the same manner as in the Example 1. The laser beam with a wavelength of 531 nm was obtained, but only the output of 30 mW was obtained in contrast with the amount of excitation light of 1 W.

Example 3

A periodic domain inversion structure with a period of 6.6 μm was formed on an MgO 5% doped lithium niobate-5 degree off-cut Y substrate of 0.5 mm thick in the same manner as in the Example 1. Next, an adhesive was applied to a non-doped lithium niobate substrate of 0.5 mm thick, to which the above-described MgO doped lithium niobate substrate was stuck. The surface of the MgO doped lithium niobate substrate was abraded and polished until the thickness thereof reached 3.7 μm.

Subsequently, a ridge-type optical waveguide was formed on this substrate by the laser abrasion method. On this occasion, the optical waveguide was processed such that a light propagation direction formed an angle of 80 degrees with respect to the Z axis of the crystal. After forming the optical waveguide, an $SiO_2$ overclad of 0.5 μm thick was formed by sputtering. After the device was cut into a length of 12 mm and a width of 1.4 mm by a dicer, the end faces of the device were polished, thereby forming the antireflection films.

The optical characteristics of this optical waveguide were measured by using the semiconductor laser. The oscillation output from the laser was adjusted at 350 mW, and the fundamental light was condensed on the end face of the waveguide by a lens; as a result, the SHG output of 160 mW was obtained. The wavelength of the fundamental light at that moment was 1062.9 nm.

Example 4

The device shown in FIG. 6 was manufactured. A periodic domain inversion structure with a period of 6.9 μm was formed on an MgO 5% doped lithium niobate Z substrate of 0.5 mm thick. This substrate was cut into a length of 2 mm and a width of 3.0 mm by a dicer. At this time, the substrate was processed such that a direction of the domain inversion plane formed an angle of 89 degrees with respect to the light propagation direction. Thereafter, the end faces of the device were polished to form the antireflection film for preventing reflection of the wavelengths of 1062 nm and 531 nm on the incident side.

This bulk device and the Nd doped YAG laser device were placed within the resonator, and excited by the semiconductor laser beam with a wavelength of 808 nm. The laser beam with a wavelength of 531 nm was obtained with the output of 100 mW in contrast with an amount of excitation light of 1 W.

Comparative Example 4

In the fourth example, when cutting out the substrate, the device was processed such that a direction of the domain inversion plane formed an angle of 78 degrees with respect to the light propagation direction. The device was placed within the resonator similarly to the above, and the optical characteristics of this device were measured. The laser beam with a wavelength of 531 nm was obtained only with the output of 19 mW in contrast with the amount of excitation light of 1 W.

The invention claimed is:

1. A harmonics generating system comprising:
   a laser source for supplying a laser beam; and
   a harmonics generating device comprising a channel type optical waveguide and a periodic domain inversion structure for converting a wavelength of the laser beam to generate higher harmonics,
   wherein said periodic domain inversion structure is formed within said waveguide,
   wherein all of the domain inversion portions of said periodic domain inversion structure are arranged parallel to a single domain inversion plane,
   wherein an angle θ formed by said domain inversion plane of said periodic domain inversion structure and a direction of propagation of the laser beam is from 82 degrees to 89 degrees when viewed from an upper surface of said harmonics generating device, and
   wherein said laser source and said harmonics generating device are arranged so that the laser beam is incident upon an end face of said harmonics generating device at substantially a right angle.

2. The system of claim 1, wherein said channel type optical waveguide is formed in an X plate or offset X plate comprising a ferroelectric single crystal.

3. The system of claim 1, wherein said domain inversion plane of said periodic domain inversion structure and said upper surface of said harmonics generating device intersect substantially at a right angle.

4. A harmonics generating system comprising:
   a laser source for supplying a laser beam; and
   a single harmonics generating device comprising a periodic domain inversion structure for converting a wavelength of the laser beam to generate higher harmonics,
   wherein all of the domain inversion portions of said periodic domain inversion structure are arranged parallel to a single domain inversion plane,
   wherein an angle θ formed by said domain inversion plane of said periodic domain inversion structure and a direction of propagation of the laser beam is from 82 degrees to 89 degrees when viewed from an upper surface of said harmonics generating device,
   wherein said periodic domain inversion structure is formed within a bulk substrate comprising a ferroelectric single crystal, and
   wherein said laser source and said harmonics generating device are arranged so that the laser beam is incident upon an end face of said harmonics generating device at substantially a right angle.

5. The system of claim 4, wherein the bulk substrate comprises a Z plate.

6. The system of claim 4, wherein said domain inversion plane of said periodic domain inversion structure and said upper surface of said harmonics generating device intersect substantially at a right angle.

* * * * *